(12) United States Patent
Kim et al.

(10) Patent No.: US 11,666,854 B2
(45) Date of Patent: Jun. 6, 2023

(54) SCRUBBER SYSTEM WITH AUTOMATIC PRESSURE CONTROL VENTURI

(71) Applicant: MAT PLUS Co., Ltd., Anseong-si (KR)

(72) Inventors: DongSoo Kim, Anseong-si (KR); ChulHwan Kim, Anseong-si (KR)

(73) Assignee: MAT PLUS Co., Ltd., Anseong-si (KR)

( * ) Notice: Subject to any disclaimer, the term of this patent is extended or adjusted under 35 U.S.C. 154(b) by 23 days.

(21) Appl. No.: 17/202,618

(22) Filed: Mar. 16, 2021

(65) Prior Publication Data

US 2022/0226772 A1    Jul. 21, 2022

(30) Foreign Application Priority Data

Jan. 18, 2021   (KR) ........................ 10-2021-0007036

(51) Int. Cl.
*B01D 53/00*   (2006.01)
*B01D 53/18*   (2006.01)
*B01D 53/14*   (2006.01)

(52) U.S. Cl.
CPC ....... *B01D 53/185* (2013.01); *B01D 53/1412* (2013.01); *B01D 53/1493* (2013.01); *B01D 2252/103* (2013.01)

(58) Field of Classification Search
CPC .......... B01D 2247/04; B01D 2252/103; B01D 47/06; B01D 47/10; B01D 47/12; B01D 53/1412; B01D 53/1493; B01D 53/185
See application file for complete search history.

(56) References Cited

U.S. PATENT DOCUMENTS

| 3,800,511 A | 4/1974 | Hull |
| 2002/0018737 A1 | 2/2002 | Holst et al. |
| 2016/0303502 A1* | 10/2016 | Higgins ................. B01D 47/06 |

FOREIGN PATENT DOCUMENTS

| KR | 1020140102446 A | 8/2014 |
| KR | 101484648 B1 | 1/2015 |
| KR | 20150054698 | * 5/2015 |

* cited by examiner

*Primary Examiner* — Sharon Pregler
(74) *Attorney, Agent, or Firm* — Dinsmore & Shohl LLP; Yongsok Choi, Esq.

(57) ABSTRACT

Provided is a scrubber system in which by improving a structure of an existing scrubber inlet preventer, a diameter of the lower end of a second cleaning liquid buffer forming the lower end of the inlet preventer is extended, a separate nozzle is installed in a lower pipe part to prevent generated powder from blocking the lower end of the inlet preventer, a path of a material to be treated first descends along the inlet preventer and then first ascends along a first chamber and a second chamber, second descends to a third chamber again, wherein the an automatic pressure control system including a venturi is installed on the upper end of the third chamber to prevent a backflow of the material to be treated, and then is guided to a fourth chamber with a polypropylene absorber to second descend in the fourth chamber and discharged to an outlet.

4 Claims, 10 Drawing Sheets

SCRUBBER SYSTEM WITH AUTOMATIC PRESSURE CONTROL VENTURI

CROSS-REFERENCE TO RELATED APPLICATION

This application claims priority to Korean Patent Application No. 10-2021-0007036 filed on Jan. 18, 2021, the entire contents of which are herein incorporated by reference.

TECHNICAL FIELD

The present invention relates to a scrubber, and more particularly, to a scrubber capable of automatically controlling a venturi pressure.

BACKGROUND ART

An EPi process has been mainly applied by an EPi process tool of a centura. Here, a large amount of viscous liquid by-products mainly cause problems. Harmful by-products exist throughout a chamber outlet, a pump-scrubber fore-line, and the inside of a scrubber. The EPi process generates a large amount of harmful by-products during the process, and these harmful by-products exist from the rear end of a process chamber to the entire exhaust line. The by-products are highly reactive, and particularly, react violently when exposed to moist air or when impacted. The by-products have various shapes from viscous liquids (called honey) to fine powders. Fore-line heating is required to reduce condensation in a rear-end line of the process chamber. Collecting the by-products using a honey trap at the front end of the scrubber may cause safety problems during maintenance of the honey trap and thus is not recommended. For safety, the by-products need to completely react with $SiO2$ in the scrubber, and reaction heat generated during the reaction needs to be absorbed with a large amount of water. An inlet preventer through which waste gas flows into the scrubber needs not to accumulate powder, and prevents powder formation by applying an eddy supply of a cleaning liquid, a gas curtain, and the like in Korea Patent Registration No. 10-1580368, filed and registered by the present applicant. However, when the inlet preventer is used for a long period of time, the powder is accumulated near a lower guide, and this problem needs to be supplemented.

In addition, there should be no backflow phenomenon between a main tool on which the scrubber is mounted and the scrubber, and it is preferable to install a blower at the rear end of the scrubber so that gas or particles do not flow back toward the main tool. However, when gas used in the main tool has a risk of causing an explosion when the blower is operated, there is a problem that the blower cannot be installed.

SUMMARY

Technical Problem

An object of the present invention is to provide a scrubber system that solves a problem that powder is accumulated on an inlet preventer even after a long-term use, and may be introduced with a material to be treated along a treatment path of a scrubber without causing a backflow into a main tool even without a blower.

Technical Solution

According to the object, the present invention provides a scrubber system in which by improving a structure of an existing scrubber inlet preventer, a diameter of the lower end of a second cleaning liquid buffer forming the lower end of the inlet preventer is extended, a separate nozzle is installed in a lower pipe part to prevent generated powder from blocking the lower end of the inlet preventer, a path of a material to be treated first descends along the inlet preventer and then first ascends along a first chamber and a second chamber, second descends to a third chamber again, wherein the an automatic pressure control system including a venturi is installed on the upper end of the third chamber to prevent a backflow of the material to be treated, and then is guided to a fourth chamber with a polypropylene absorber to second ascend in the fourth chamber and discharged to an outlet.

Here, the first chamber, the second chamber, the third chamber, and the fourth chamber are all provided with a water treatment device to perform water treatment on the material to be treated.

A water treatment nozzle is disposed in an upper portion spaced apart from the upper end of the venturi to spray water toward the venturi.

The first chamber is connected and disposed at a lower end of the inlet preventer, the second chamber is disposed at an upper end of the first chamber, the third chamber is disposed at a side end in a diagonal direction of the first and second chambers, the fourth chamber is disposed at the side end of the third chamber, a partition formed with an opening is placed between the first chamber and the second chamber, the second chamber and the third chamber are connected to each other by a pipeline, and the third chamber and the fourth chamber are connected to each other by a pipeline or separated from each other by the partition with the opening.

A nozzle installed in the lower pipe part connected to the lower pipe of the second cleaning liquid buffer of the inlet preventer is installed to allow a liquid to cross the pipeline of the lower pipe part or to be sprayed upward or downward.

That is, the present invention provides an inlet preventer for a scrubber including: an inlet for introducing a material to be treated from an inlet port through which the material to be treated flows into the scrubber; a cleaning liquid buffer connected to the inlet to supply a cleaning liquid; and an inlet lower pipe nozzle that is connected to the lower portion of the cleaning liquid buffer or the lower end of the cleaning liquid buffer and installed in a lower pipe part through which the material to be treated passes, and sprays a liquid into a pipeline through which the material to be treated passes. The cleaning liquid buffer has a cross-sectional area which is constantly uniform or extended downward. The inlet is a double inlet including two-layered pipes, and the cleaning liquid buffer includes a first cleaning liquid buffer having a gas inlet and a cleaning liquid inlet, and a second cleaning liquid buffer coupled to a lower end of the first cleaning liquid buffer.

Further, the present invention provides an automatic pressure control system for a scrubber which forms a negative pressure of introducing a material to be treated flowing through the inlet preventer for the scrubber into a chamber included in the scrubber, the automatic pressure control system including: a venturi installed inside a chamber included in the scrubber; and a nozzle of an automatic pressure control unit arranged above the venturi and on the ceiling of the chamber. The venturi is configured and arranged in a tubular shape with a cross-sectional area widened downward, the nozzle of the automatic pressure control unit is arranged to be spaced apart from the upper end of the venturi, and is arranged to supply a liquid into an upper diameter of the venturi.

Further, the present invention provides a scrubber including: the scrubber inlet preventer; a first chamber connected to a lower pipe part of the scrubber inlet preventer; a second chamber separated from the first chamber with a partition having an opening and adjacent to the first chamber; a third chamber communicating with the second chamber through a pipeline; and a fourth chamber adjacent to the third chamber, but connected to the partition having the opening or the pipeline, and including a polypropylene absorber. The third chamber includes the automatic pressure control system for the scrubber, and a material to be treated passes through the first chamber and the second chamber after passing through the scrubber inlet preventer, flows into the third chamber by a negative pressure formed by the automatic pressure control system for the scrubber to pass through the third chamber, flows into the fourth chamber to pass through the polypropylene absorber, and then is discharged through an outlet.

The second chamber is disposed on the upper end of the first chamber, the third chamber is disposed on the side projected in a diagonal direction with respect to a space in which the first chamber and the second chamber are located, one side of the fourth chamber is adjacent to the third chamber and the other side thereof is disposed adjacent to the space in which the first chamber and the second chamber are located, and the first chamber, the second chamber, the third chamber and the fourth chamber include nozzles for wet treatment.

The material to be treated passes through the inlet preventer and first descends, first ascends while passing through the second chamber from the first chamber, second descends in the third chamber, and second ascends in the fourth chamber.

Advantageous Effects

According to the present invention, even if the generated powder falls down, it is possible to pass through the pipeline without clogging the pipeline due to extending the diameter of the lower pipe of the second washing liquid buffer forming the lower pipe of the scrubber inlet preventer. In addition, the nozzle installed in the lower pipe part sprays a liquid that produces a propulsive force that crosses the diameter of the lower pipe part to prevent the powder from being accumulated on the wall surface of the lower pipe part, thereby actively removing the clogging of the pipe.

Further, in the present invention, the automatic pressure control system with the venturi is installed so that the material to be treated flows along the inner path of the scrubber, thereby preventing the material to be treated from flowing back to the main tool without a blower.

DETAILED DESCRIPTION

Hereinafter, preferred embodiments of the present invention will be described in detail with reference to the accompanying drawings.

Figure 1:
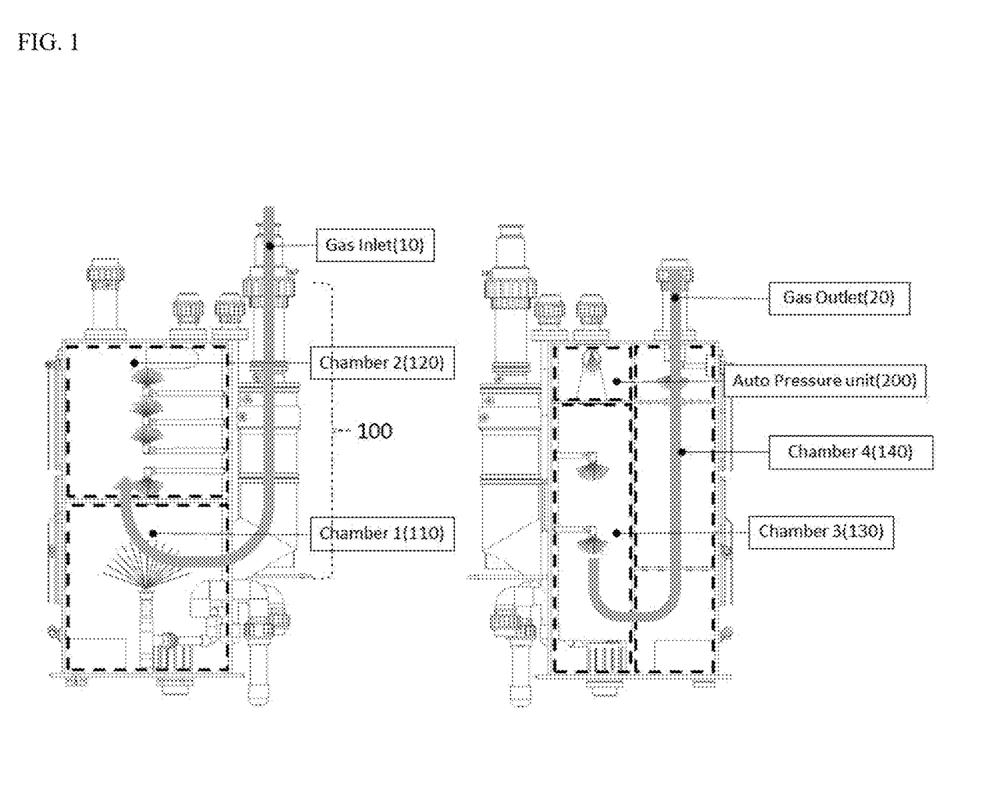
FIG. 1 is a schematic flowchart showing a schematic structure and a treatment flow of the present invention.

FIG. 1 schematically shows a structure of a scrubber and is a schematic flowchart showing a treatment flow of the present invention. A material to be treated, including harmful gases, particles, and the like generated from a main tool such as a semiconductor manufacturing apparatus, descends and flows into an inlet preventer 100 through an inlet port 10 disposed on a scrubber, flows into a first chamber 110 to which a lower pipe part at the lower end of the inlet preventer is connected, and ascends into a second chamber 120 arranged above the first chamber 110. The first chamber 110 and the second chamber 120 are vertically adjacent to each other with a partition having an opening, so that the material to be treated ascends through the opening. The inlet preventer 100 includes a nozzle that supplies water so that the material to be treated may flow without accumulation using the flow of water, and the first chamber 110 and the second chamber 120 perform a preliminary wetting process for the material to be treated. In the first chamber, a nozzle for upward spraying like a fountain is installed, and in the second chamber, downward spray nozzles and upward spray nozzles are installed to perform the wetting process.

The second chamber 120 is adjacent to a third chamber 130, and a pipe connecting both the chambers is disposed or a partition having an opening is disposed, so that the material to be treated flows into the third chamber 130 through a pipe or an opening. In the embodiment, the second chamber 120 and the third chamber are connected to each other through a pipe. A nozzle for supplying water is disposed on the ceiling of the third chamber 130, and as an automatic pressure control system 200 for reinforcing the inflow of the material to be treated and preventing a backflow, a venturi is spaced apart from the nozzle to be disposed under the nozzle. The material to be treated descending to the lower side of the third chamber 130 through the venturi is subjected to water treatment in an intermediate step in the third chamber 130, and flows into a fourth chamber 140 adjacent to the third chamber and communicating with each other through a pipeline or opening, and the fourth chamber 140 performs final water treatment using a polypropylene (PP) absorber. The finally treated material is discharged to the outside of the scrubber through an outlet 20 installed in the fourth chamber 140. A plurality of nozzles for the wetting process may be arranged in all of the first chamber, the second chamber, the third chamber and the fourth chamber.

A path of the material to be treated is as follows. The material to be treated flows into through the inlet preventer 100 and descends first along the inlet preventer, flows into the first chamber connected to the lower pipe at the lower end of the inlet preventer, flows into the second chamber above the first chamber and first ascends, flows into the third chamber adjacent to the second chamber again and then second descends in the third chamber, and flows into the fourth chamber adjacent to the third chamber and second ascends in the fourth chamber while passing through the PP absorber to be discharged through the outlet.

In the embodiment, the first chamber is located relatively lower than the second chamber, the third chamber is elongated at a portion corresponding to the sides of the first chamber and the second chamber, and the fourth chamber is configuring to be located on the side surface of the third chamber with approximately the same length to save the space. The first chamber and the second chamber have a partition with an opening therebetween, and the second chamber is disposed with a pipeline connected to the upper part of the third chamber (above the center of the third chamber). This is because the third chamber is disposed at side ends projected in a diagonal direction with respect to the first chamber and the second chamber. That is, the third chamber is located in a space adjacent side by side to the space in which the inlet preventer is arranged and adjacent side by side to the fourth chamber.

Figure 2:
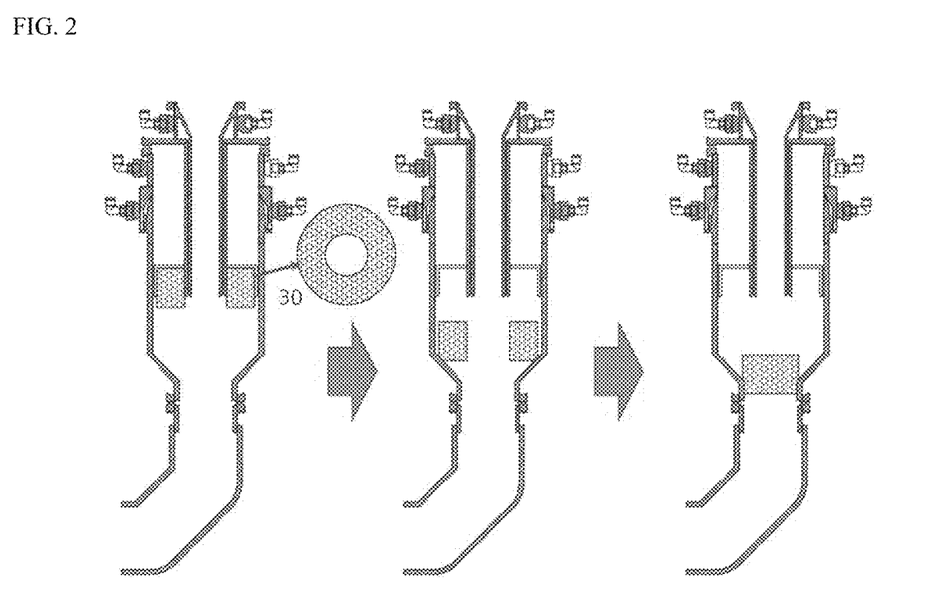
FIG. 2 is a view showing a structure and problems of a scrubber inlet preventer according to the related art.

FIG. 2 is a view showing a structure and problems of a scrubber inlet preventer according to the related art. The related art relates to an inlet preventer disclosed in Patent No. 10-1580368 filed and registered by the present applicant, and it is shown that the powder 30 is generated due to moisture inside the guide. When a large amount of powder is accumulated, the powder falls down due to its own weight, and as a result, a diameter of a lower pipe of a second cleaning liquid buffer forming the lower pipe of the inlet preventer is tapered to be gradually narrowed, and thus, a clogging phenomenon may occur in the lower pipe part.

Figure 3:
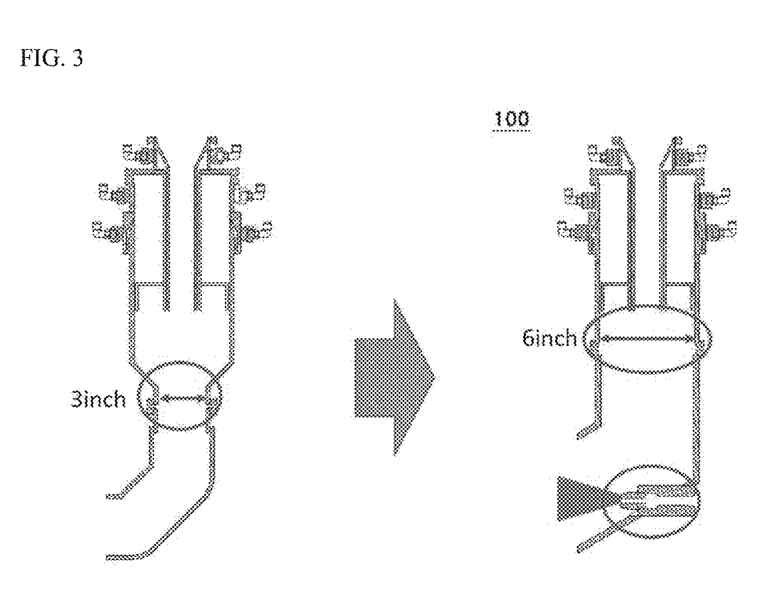
FIG. 3 is a cross-sectional view showing the overall structure of the scrubber inlet preventer according to the present invention.

FIG. 3 is a cross-sectional view showing the overall structure of the scrubber inlet preventer according to the present invention. In the present invention, to solve the problem, the lower pipe and the diameter of the lower pipe part of the inlet preventer are enlarged as shown in FIG. 3. That is, if an end diameter of the tapered lower pipe of the second cleaning liquid buffer of the conventional inlet preventer was 3 inches, the end diameter of the lower pipe is 6 inches by maintaining the cylindrical silhouette of the second cleaning liquid buffer without taking a tapering structure. The numerical values are illustrative, and the diameter of the lower pipe of the second cleaning liquid buffer of the inlet preventer may be maintained as it is without tapering or may be further extended.

Figure 4:
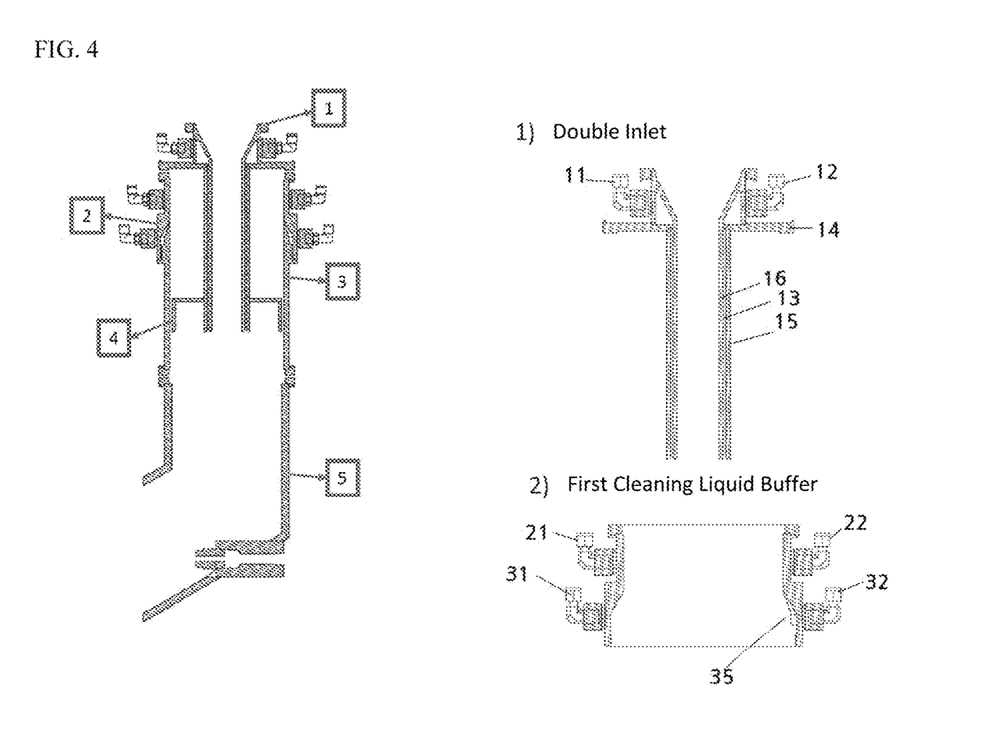
FIG. 4 is a cross-sectional view showing the detailed structure of the scrubber inlet preventer according to the present invention.
Figure 5:
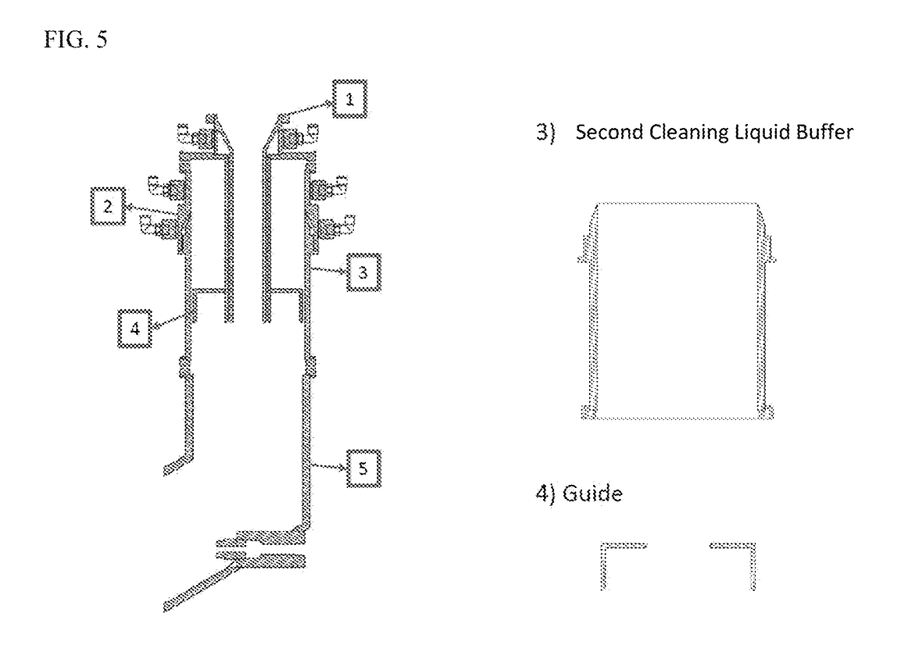
FIG. 5 is a cross-sectional view showing the detailed structure of the scrubber inlet preventer according to the present invention.
Figure 6:
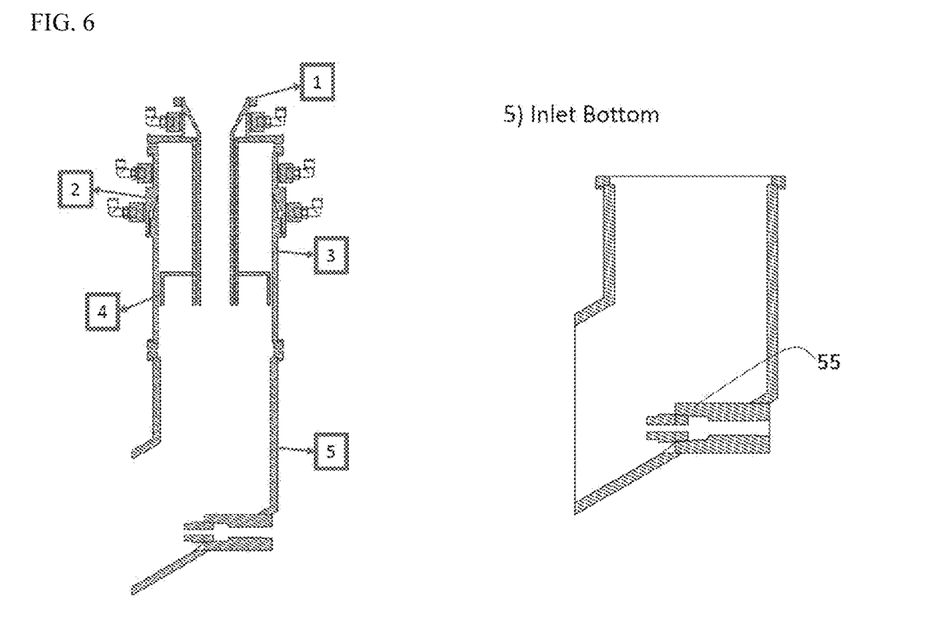
FIG. 6 is a cross-sectional view showing the detailed structure of the scrubber inlet preventer according to the present invention.

FIGS. 4 to 6 are cross-sectional views showing the detailed structure of the scrubber inlet preventer 100 according to the present invention. Except for the shape of the lower pipe of the second cleaning liquid buffer and the lower pipe part, the scrubber inlet preventer 100 is the same as disclosed in Patent No. 10-1580368, and the contents of the patent are incorporated as it is within the limit overlapping with the present invention.

The scrubber inlet preventer includes a double inlet 1 serving as a primary path through which toxic gas flows, a first cleaning liquid buffer 2 disposed below the double inlet like as surrounding the double inlet, and a second cleaning liquid buffer 3 arranged in close contact with the lower end thereof.

FIG. 4 shows the first cleaning liquid buffer 2, which is an upper structure of the cleaning liquid buffer, and FIG. 5 shows the second cleaning liquid buffer 3 and the guide 4 disposed therebelow.

The first cleaning liquid buffer 2 located at a relatively upper portion includes a gas inlet end provided with a pair of gas inlets 21 and 22 for supplying nitrogen and a cleaning liquid inlet end formed integrally therewith and formed at the lower end thereof. At the cleaning liquid inlet end, a pair of cleaning liquid inlets 31 and 32 are also rotatably formed to allow adjustment of the direction, and these cleaning liquid inlets are configured to introduce and discharge the cleaning liquid in a tangential component direction with respect to the wall surface of the cleaning liquid inlet end formed as a cylindrical shape or a polygonal column close thereto. The pair of cleaning liquid inlets 31 and 32 is formed at points facing each other, and the outlet side of the cleaning liquid inlets 31 and 32 is oriented to guide the flow path so that the inflow direction is set to cause a vortex by rotating the cleaning liquid flowing through the cleaning liquid inlets along the wall. The cleaning liquid may be a solution mixed with water and other chemicals as needed.

The cleaning liquid inlets 31 and 32 are configured to have an opening in a gap 35 between the outer wall and the inner wall surface of the cleaning liquid inlet end, so that the cleaning liquid fills the gap 35 and overflows upwards and flows along the inner wall surface of the cleaning liquid inlet end. The configuration of the cleaning liquid inlets 31 and 32 allows the cleaning liquid to flow down while rotating in a radial direction of the inner wall, instead of flowing vertically through the cleaning liquid inlet end and the inner wall surface of the second cleaning liquid buffer 3 placed therebelow. This rotational motion itself may have the ability to prevent or remove the powder, so that the inlet may be prevented from clogging.

A pair of gas inlets 21 and 22 formed at the gas inlet end disposed at the upper end of the cleaning liquid inlet end are also formed at positions facing each other. These gas inlets 21 and 22 supply nitrogen or an inert gas, and flow down while rotating the gas with the cleaning liquid to form a curtain for the cleaning liquid. That is, the nitrogen or inert gas surrounds the surface of the cleaning liquid and serves to prevent the cleaning liquid from forming powder by contacting the toxic gas. Therefore, it is preferable that the pair of gas inlets 21 and 22 also have the same opposite structure as the cleaning liquid inlets 31 and 32.

This first cleaning liquid buffer 2 is assembled on the second cleaning liquid buffer 3. The second cleaning liquid buffer 3 is formed in a cylindrical shape or a polygonal column shape close thereto, and the lower portion thereof is configured by a lower pipe that maintains or extends the diameter without tapering, and the lower pipe end is connected to the lower pipe part 5 to be connected to a main processing device. The connection part has several recesses, steps, and flanges required for assembly.

In order to more reliably prevent the powder generated from the contact between the cleaning liquid and the toxic gas, the double inlet 1 was provided as shown in FIG. 4.

The double inlet 1 consists of two-layered pipes 15 and 16, a central passage formed with the inner pipe 16 becomes an inlet of the toxic gas, and a gap 13 between the two pipes becomes a gas passage of nitrogen and the like. That is, a pair of gas inlets 11 and 12 is installed in the pipe 15 on the outer side of the two-layered pipes to introduce nitrogen or inert gas to flow through the gap 13 between the pipes. The upper end of the inner pipe 16 is formed in a funnel shape and is surrounded by the inside of the outer pipe 15, and the gas inlets 11 and 12 are installed at the upper end of the outer pipe 15, wherein the upper end is a little thicker than the lower end, so that the gap space is wide to take in the initial inflow. In addition, a kind of flange part 14 is formed at the upper end of the outer pipe 15 in consideration of the convenience of assembly, and the outer pipe 15 extends downward therefrom. Nitrogen or inert gas that flows down along the gap 13 in the pipe serves as a kind of mist blower, so that mist generated from the cleaning liquid flowing down along the wall surface of the cleaning liquid buffer contacts the toxic gas flowing through the central passage to prevent powder from being generated at the end of the gap 13.

That is, according to the present invention, when the cleaning liquid is supplied, the cleaning liquid flows along the wall surface of the cleaning liquid buffer while rotating to prevent the powder from being generated by the quantity of motion itself, and the nitrogen or inert gas is supplied through the gas inlets 21 and 22 formed in the first cleaning liquid buffer to close a kind of curtain on the cleaning liquid, thereby preventing the powder from being primarily generated. Furthermore, the nitrogen or inert gas is blown in the gap 13 between the pipes of the double inlet 1 into which the toxic gas is introduced to secondarily prevent the generation of powder by mist, thereby implementing an inlet for a scrubber that can be used for a long time without clogging.

In addition, a guide member may be provided to more reliably hold the flow path of the cleaning liquid. That is, referring to FIG. 5, there is shown a guide member 4 having a disk-shaped flat portion having an opening in the center and a guide portion folded vertically from the outer end thereof. The guide member 4 is assembled in a force-fitting manner between the outer wall surface of the outer pipe 15 of the double inlet 1 and the inner wall surface of the second cleaning liquid buffer 3. The guide portion in the vertical direction serves to guide the flow path of the cleaning liquid to depart from the inner wall surface of the cleaning liquid buffer, thereby suppressing the generation of mist and ultimately, more completely preventing the generation of powder.

In the above-described embodiment, each of the gas inlets 11, 12, 21, and 22 and the cleaning liquid inlets 31 and 32 are provided in a pair, but may be provided in one or more pairs. Also, the first cleaning liquid buffer and the second cleaning liquid buffer may be integrally configured.

FIG. 6 shows an inlet lower pipe nozzle 55 installed in the lower pipe part 5 of the inlet preventer according to the present invention. As described above, the lower pipe part 5 of the inlet preventer has a diameter substantially the same as that of the lower portion of the second cleaning liquid buffer, and has a nozzle 55 installed in a direction in which the liquid may be sprayed across the pipeline of the lower pipe part 5. Preferably, the nozzle 55 is installed at a point where a bent portion begins after the lower pipe part 5 extends vertically. This takes into account the fact that the powder is likely to be accumulated on the inclined surface due to bending. The liquid sprayed from the nozzle 55 impacts and melts the powder, and simultaneously gives power to flow down without clogging. However, the position of the inlet lower pipe nozzle 55 is not limited and may be installed at a position slightly above or slightly below the portion at which the lower pipe part begins to be bent.

In addition, as described above, the lower pipe part 5 connected to the second cleaning liquid buffer 3 may be integrally configured with the second cleaning liquid buffer 3, and in this case, the lower pipe part 5 becomes the lower portion of the second cleaning liquid buffer 3 itself, and the nozzle 55 may be installed herein. That is, the nozzle 55 is disposed at the lower pipe part constituting the lower portion of the entire configuration of the inlet preventer 100, and sprays the liquid to prevent clogging.

The extension of the lower pipe without tapering, the diameter of the lower pipe part enlarged accordingly, and the configuration of the nozzle installed in the lower pipe part are free from powder clogging even when the scrubber is used for a long time.

The material to be treated passing through the inlet preventer is wet-treated by a plurality of nozzles installed in each chamber while passing through the first chamber and the second chamber. The liquid is mainly water, and may be pure water or a liquid with chemicals added as needed, and is purified by water treatment. The material to be treated proceeding from the second chamber to the third chamber passes through a pipeline connecting the second chamber and the third chamber. To reduce the space occupied by the scrubber and to place the inlet and outlet as far as possible, the third chamber is disposed in a position diagonally facing the first chamber and the second chamber, a pipeline through which the material to be treated in the second chamber flows into the third chamber is arranged, and at this time, the automatic pressure system is installed in the third chamber to guide the smooth path of the material to be treated and prevent a backflow.

Figure 7:
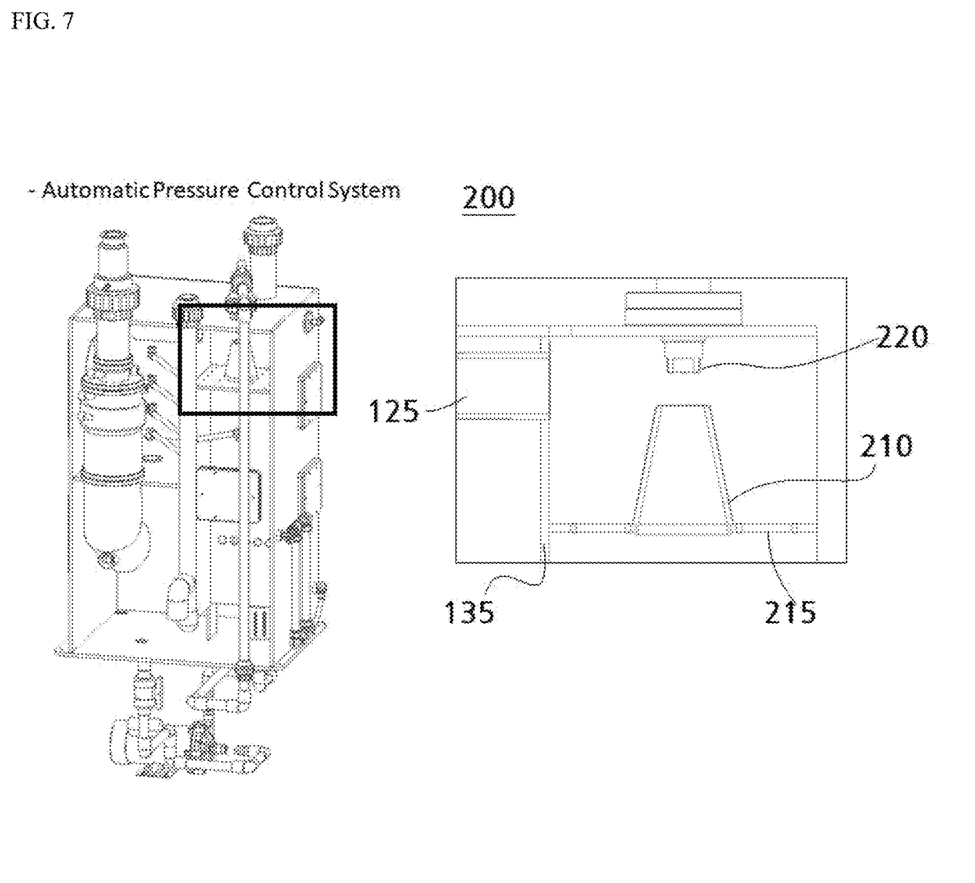
FIG. 7 is a view showing an automatic pressure control system of the present invention.

FIG. 7 is a view showing an automatic pressure control system of the present invention.

The pressure at which the material to be treated flows from the inlet preventer 100 side may be reduced, and in this case, the introduction of the material to be treated into the third chamber 130 may be weakened, and further, the backflow to the main tool may occur. In EPI and TCS processes, since there is no dry pump at the front end of the scrubber and the scrubber is directly connected with the main tool, when a main tool gate is turned on/off, if the scrubber pressure is lower than that of the main tool, there may be a problem that particles are present in the main tool. Therefore, the scrubber pressure should be kept higher at a negative pressure (−100 mmH2O) than in the main tool. On the other hand, it is impossible to install a blower at the rear end of the scrubber, so that the negative pressure cannot be made by driving the blower. This is because the H2 gas discharged from the scrubber may cause an explosion problem due to sparks generated during a fan operation of the blower. Accordingly, the present invention constitutes the automatic pressure control system 200 to generate and maintain the negative pressure in the scrubber.

Figure 8:
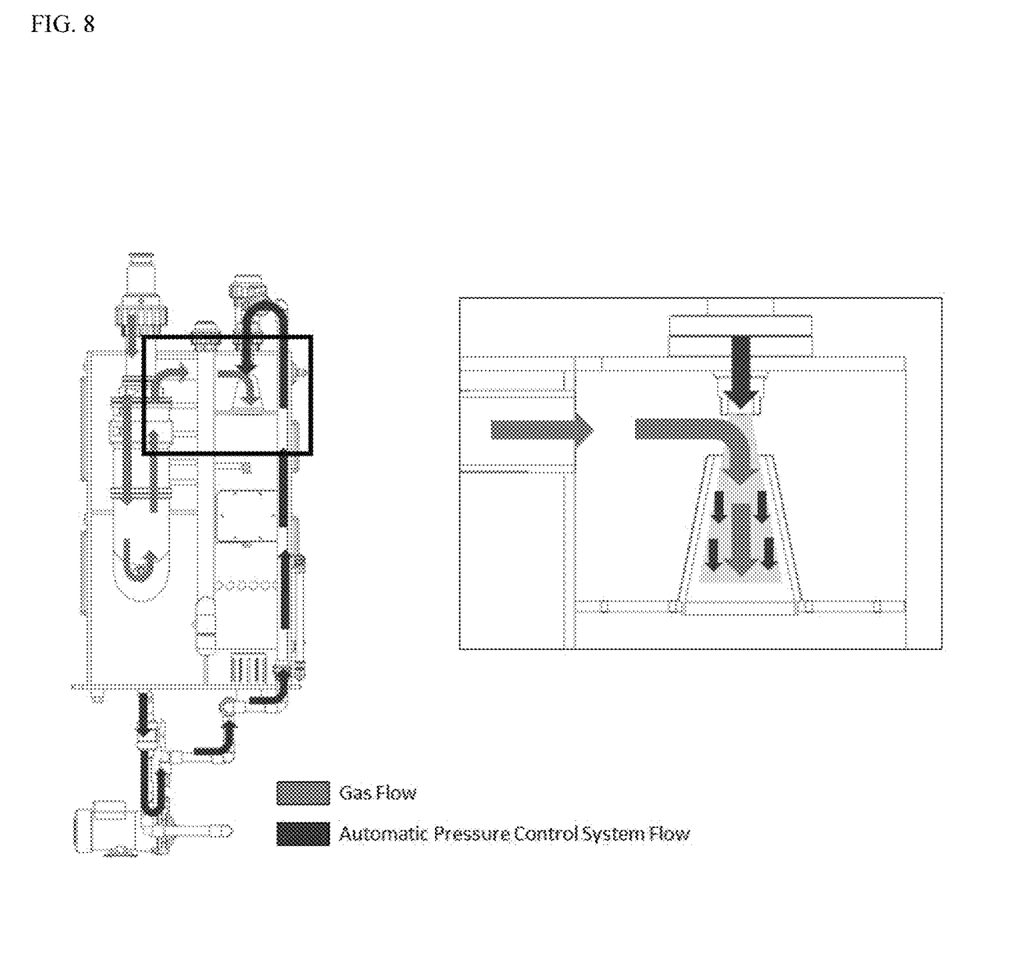
FIG. 8 is a view describing a function of the automatic pressure control system of the present invention.

A pipeline 125 through which the material to be treated flows from the second chamber to the third chamber is connected to the upper portion of the partition 135 of the third chamber. In order to strengthen the inflow toward the third chamber by forming the negative pressure with respect to the flowing material to be treated, a venturi 210 having a tubular shape with a cross-sectional area widened downward, such as a cone shape, is installed around the opening of the pipeline 125. In the venturi 210, an end portion having a narrow diameter is arranged on the opening side of the pipeline 125 and an end portion having a diameter increasing downward is arranged. The lower end of the venturi is supported by a supporter 215. The installation of the venturi receives the negative pressure by the material to be treated passing through the opening of the pipeline 125 to descend into the venturi over a strong air current. In addition, a nozzle 220 of an automatic pressure control unit is installed on the ceiling of the third chamber to inject water or a liquid mixed with chemicals into the opening with the narrow diameter of the venturi 210. Accordingly, the material to be treated is wet-treated and at the same time, the negative pressure is increased, and the flow velocity of the material to be treated increases due to the venturi effect, to promote an increase in the negative pressure again, thereby exhibiting a synergistic effect. Such an automatic pressure control system 200 becomes a pressure compensating device when the pressure on the inlet preventer side is reduced, and induces the flow of the material to be treated. FIG. 8 helps to understand the flow of the material to be treated and the role of the automatic pressure control system.

Figure 9:
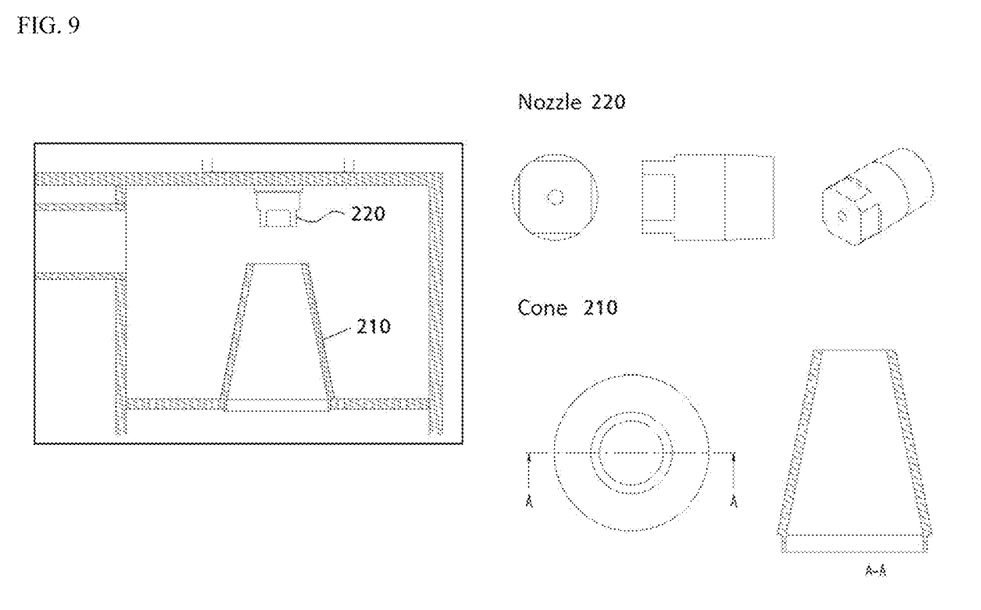
FIG. 9 is a view showing a detained configuration of the automatic pressure control system of the present invention.

FIG. 9 is a view showing a detained configuration of the automatic pressure control system of the present invention.

Detailed shapes of the nozzle 220 and the cone-shaped venturi 210 are shown in detail. The diameter of the nozzle installed on the ceiling of the third chamber is configured to be smaller than the small diameter of the venturi. The liquid is supplied to the nozzle 220 at an appropriate hydraulic pressure.

Figure 10:
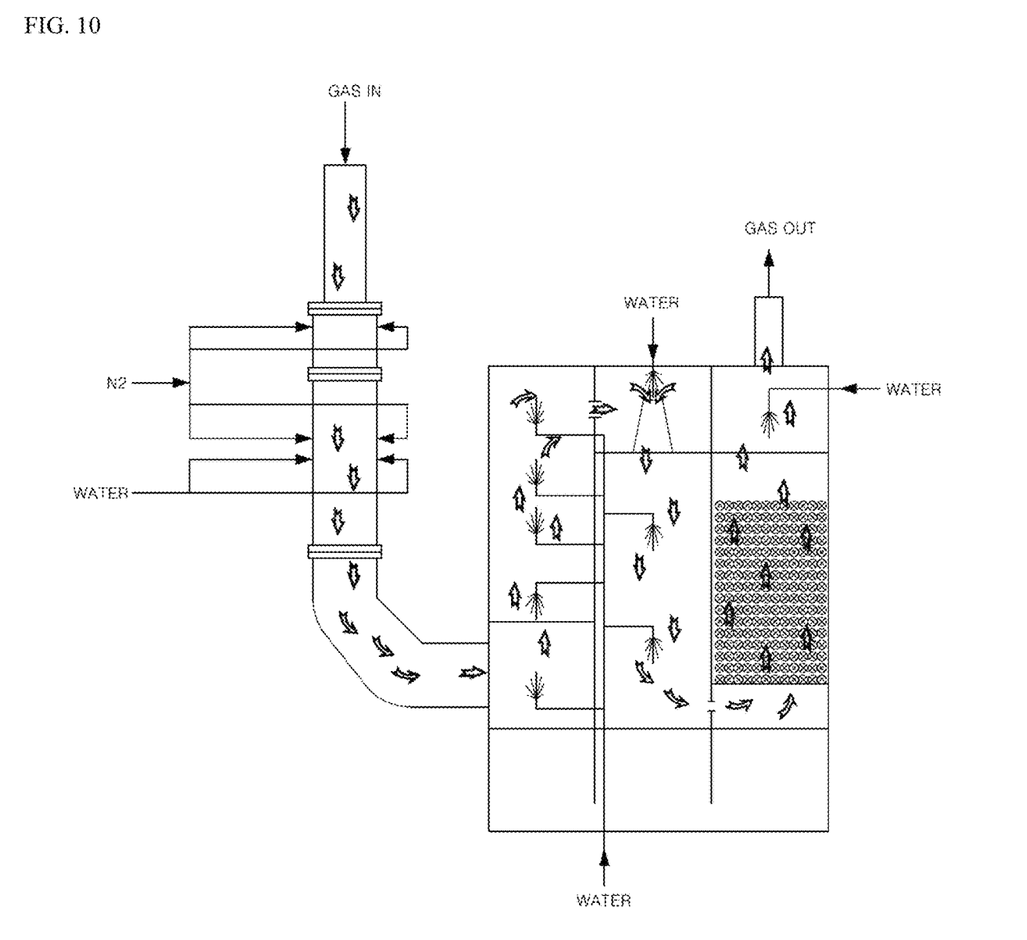
FIG. 10 is a view showing a configuration and a function of the entire scrubber of the present invention.

FIG. 10 is a view showing a configuration and a function of the entire scrubber of the present invention.

The material to be treated flowing into the inlet preventer through the inlet first descends through the inlet preventer, and ascends first through the first chamber and the second chamber. The material to be treated, which is preliminary wet-treated by a plurality of nozzles in the first chamber and the second chamber and flows into the third chamber due to the negative pressure by the automatic pressure control device of the third chamber, descends second in the third chamber, flows into the fourth chamber provided with the PP absorber to pass through the PP absorber, and second ascends to be discharged to the outlet.

As such, it is possible to implement a scrubber in which there is no clogging of the inlet preventer even if using for a long period of time and the material to be treated may proceed smoothly without installing a separate blower.

On the other hand, the specific numerical values presented in the embodiments are illustrative and can be modified as needed of course, and those skilled in the art to which the present invention pertains will appreciate that the present invention can be implemented in other specific forms without changing the technical spirit or essential features thereof. Therefore, it should be appreciated that the aforementioned embodiments are illustrative in all aspects and are not restricted. The scope of the present invention is represented by claims to be described below rather than the detailed description, and it is to be interpreted that the meaning and scope of the claims and all the changes or modified forms derived from the equivalents thereof come within the scope of the present invention.

EXPLANATION OF REFERENCE NUMERALS AND SYMBOLS

Double inlet (1)
First cleaning liquid buffer (2)
Second cleaning liquid buffer (3)
Guide (4)
Lower pipe part (5)
Inlet port (10)
Outlet (20)
(Inlet lower pipe) Nozzle (55)
Inlet preventer (100)
First chamber (110)
Second chamber (120)
Third chamber (130)
Fourth chamber (140)
Powder (30)
Gas inlet (21, 22)
Cleaning liquid inlet (31, 32)
Gap (35)
Gap (13)
Inner pipe (16)
Side pipe (15)
Flange part (14)
Gas inlet (11, 12, 21, 22)
Automatic pressure control system (200)
Venturi (210)
Pipeline (125)
Partition (135)
(Automatic pressure control unit) Nozzle 220
Supporter (215)

What is claimed is:

1. An automatic pressure control system for a scrubber which forms a negative pressure of introducing a material to be treated flowing through an inlet preventer for the scrubber into a chamber included in the scrubber, the automatic pressure control system comprising:
   a venturi installed inside the chamber included in the scrubber; and
   a nozzle of an automatic pressure control unit arranged above the venturi and on a ceiling of the chamber,
   wherein the inlet preventer for the scrubber comprises:
   an inlet for introducing a material to be treated into the scrubber;
   a cleaning liquid buffer coupled to the inlet to supply a cleaning liquid; and
   an inlet lower pipe nozzle that is connected to a lower portion of the cleaning liquid buffer or a lower end of the cleaning liquid buffer and installed in a lower pipe part through which the material to be treated passes, and sprays a liquid into a pipeline through which the material to be treated passes,
   wherein the cleaning liquid buffer has a cross-sectional area which is constantly uniform or extended downward,
   wherein the venturi is configured and arranged in a tubular shape with a cross-sectional area widened downward, and
   the nozzle of the automatic pressure control unit is arranged to be spaced apart from an upper end of the venturi, and is arranged to supply a liquid into an upper diameter of the venturi.

2. A scrubber comprising:
   a scrubber inlet preventer comprising:
   an inlet for introducing a material to be treated into the scrubber;
   a cleaning liquid buffer coupled to the inlet to supply a cleaning liquid; and
   an inlet lower pipe nozzle that is connected to a lower portion of the cleaning liquid buffer or a lower end of the cleaning liquid buffer and installed in a lower pipe part through which the material to be treated passes, and sprays a liquid into a pipeline through which the material to be treated passes, wherein the cleaning liquid buffer has a cross-sectional area which is constantly uniform or extended downward;
   a first chamber connected to a lower pipe part of the scrubber inlet preventer;
   a second chamber separated from the first chamber with a partition having an opening and adjacent to the first chamber;
   a third chamber communicating with the second chamber through a pipeline; and
   a fourth chamber adjacent to the third chamber, but connected to the partition having the opening or the pipeline, and including a polypropylene absorber,
   wherein the third chamber includes the automatic pressure control system for the scrubber of claim 1, and a material to be treated passes through the first chamber and the second chamber after passing through the scrubber inlet preventer, flows into the third chamber by a negative pressure formed by the automatic pressure control system for the scrubber to pass through the third chamber, flows into the fourth chamber to pass through the polypropylene absorber, and then is discharged through an outlet.

3. The scrubber of claim 2, wherein the second chamber is disposed on the upper end of the first chamber, the third chamber is disposed on the side projected in a diagonal direction with respect to a space in which the first chamber and the second chamber are located, one side of the fourth chamber is adjacent to the third chamber and the other side thereof is disposed adjacent to the space in which the first chamber and the second chamber are located, and the first chamber, the second chamber, the third chamber and the fourth chamber include nozzles for wet treatment.

4. The scrubber of claim 3, wherein the material to be treated passes through the inlet preventer and first descends, first ascends while passing through the second chamber from the first chamber, second descends in the third chamber, and second ascends in the fourth chamber.

* * * * *